United States Patent

[11] 3,601,639

[72] Inventors John J. Hannon
Whitehall, Pa.;
Peter Lloyd, Derry, N.H.; Robert T. Smith,
Coopersburg, Pa.

[21] Appl. No. 1,699
[22] Filed Jan. 9, 1970
[45] Patented Aug. 24, 1971

[73] Assignee Bell Telephone Laboratories, Incorporated
Murray Hill, Berkeley Heights, N.J.

[54] LOW-TEMPERATURE COEFFICIENT LITHIUM TANTALATE RESONATOR
7 Claims, 12 Drawing Figs.

[52] U.S. Cl. .......... 310/9.5, 252/62.9, 333/72
[51] Int. Cl. .......... H01v 7/00
[50] Field of Search .......... 310/8.5, 9.5, 9.6; 252/62.9; 333/72

[56] References Cited
UNITED STATES PATENTS

| | | | |
|---|---|---|---|
| 3,525,885 | 8/1970 | Ballman et al. .......... | 310/9.5 |
| 3,461,408 | 8/1969 | Onoe et al. .......... | 310/9.5 X |
| 2,486,187 | 10/1949 | Mason .......... | 310/9.5 |

*Primary Examiner*—Milton O. Hirshfield
*Assistant Examiner*—B. A. Reynolds
*Attorneys*—R. J. Guenther and Edwin B. Cave

ABSTRACT: Length extensional mode and width-length flexure mode resonators fabricated from lithium tantalate piezoelectric single crystals cut to have orientations within the range of *zyw* (+25°) to *zyw* (+50°) exhibit zero temperature coefficients of frequency, thus permitting their use as resonators in wideband crystal filters and voltage controlled oscillators.

INVENTORS J. J. HANNON
P. LLOYD
R. T. SMITH
BY George S. Indig
ATTORNEY

LOW-TEMPERATURE COEFFICIENT LITHIUM TANTALATE RESONATOR

BACKGROUND OF THE INVENTION

1. Field of the Invention

This invention relates to piezoelectric single crystal resonators of lithium tantalate and to devices utilizing the same.

2. Prior Art

There are innumerable instances in the electrical and communications fields in which it is desirable to couple two electrical circuits together in such a fashion that only a predetermined limited band of frequencies passes through the coupling. While this function can be performed by conventional circuit devices, significant reductions in both cost and size have been shown to accrue from the use of a piezoelectric crystal filter (see for example R. A. Sykes and W. L. Smith, "A Monolithic Crystal Filter" 46, *Bell Laboratories Record* 52 (1968). The operation of such filters is based upon the existence of resonant frequencies associated with various modes of mechanical vibration of the crystals. When electrical signals are introduced, the piezoelectric effect causes the crystal to vibrate mechanically at a band of frequencies including the resonant frequency, and to convert these vibrations to electrical output signals having corresponding frequencies.

In general, it may be stated that for a given mode of vibration the size of the crystal increases with decreasing resonant frequency. It has been found convenient for higher frequency operation to utilize the thickness-shear mode of vibration. However, within the medium frequency range, for example from 10 kilohertz to 3 megahertz, it has been found that operation in the length extensional and width-length flexure modes results in significant reduction of crystal size.

At present these medium frequency range resonators are generally fabricated from 5° X-cut quartz. A principal disadvantage of quartz, however, is that it has a relatively low coupling coefficient thus necessitating narrow bandwidth filters. Materials having higher coupling coefficients such as lithium tantalate (which has been proposed for use in the shear mode) have generally not been considered suitable for use in the extensional or flexure mode for some applications due to expected high temperature coefficient of frequency for these modes.

Further disadvantages of quartz include a relatively high impedance, and the existence of unwanted vibrational modes.

There is thus indicated a need for a piezoelectric single crystal material which may be used in wideband filters in the medium frequency range.

SUMMARY OF THE INVENTION

It has now been discovered that single crystals of piezoelectric lithium tantalate cut to have orientations within the range of *zyw* (+25°) to *zyw* (+50°) when operated as length-extensional mode or width-length flexure mode resonators within the frequency range of 10 kilohertz to 3 megahertz exhibit zero temperature coefficients of frequency.

Such crystals exhibit a high electromechanical coupling coefficient, enabling their use in wideband crystal filters and voltage controlled oscillators. In addition, these crystals exhibit low electrical impedance, substantial freedom from unwanted modes of vibration, and variation of the temperature of zero temperature coefficient of frequency with the orientation angle, thus permitting location of this temperature at any desired point between 15° and 120° C.

DETAILED DESCRIPTION OF THE INVENTION

Figure 1:
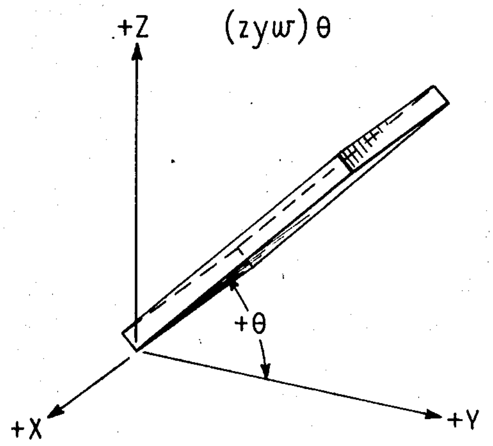
FIG. 1 is a schematic diagram representing the crystal orientation of a lithium tantalate single crystal plate in accordance with the invention.

The orientation of the single lithium tantalate resonators of the invention is shown in FIG. 1, in which three dimensional space is represented by $x$, $y$, and $z$ axes, the $z$ axis corresponding to the optical axis of the $LiTaO_3$ crystal. The $+y$ axis defines the length, the $+x$ axis defines the width, and the $+z$ axis defines the thickness of the crystal, while the angle $\theta$, which is positive for a counterclockwise rotation from the $+y$ axis towards the $+z$ axis, defines its rotation about the $x$ axis. This orientation may be designated as the *xyw* $\theta$ cut, according to the Institute of Radio Engineers Standard on Piezoelectric Crystals: *Proceedings Institute of Radio Engineers*, Vol. 37, No. 12, Dec. 1949. These resonators may be operated in the width-length flexure mode within the frequency range of 10 to 150 kilohertz, and in the fundamental length extensional mode within the frequency range of 100 kilohertz to 1 megahertz. By the utilization of the third and fifth overtones of the length extensional mode, the upper limit of frequency may be extended to 3 megahertz. Below the respective lower limits of frequency range, the size of the crystals becomes too large due not only to the difficulty in growing good quality single crystals to such sizes, but also to the diminution of space saving over alternative filter designs. Above the respective upper limits of frequency range the crystals are so small that difficulties in fabrication severely limit the attainment of zero temperature coefficient characteristics.

Although in practice it is observed that the vibrations set up in the crystal are characterized by a band of frequencies, it is convenient to refer to a single "center frequency," $f$, which when multiplied by the crystal dimensions appropriate to the particular mode of interest gives a frequency constant, $K_f$. For the length extensional mode, $$l \times f = K_f, \qquad (1)$$

where $l$ is crystal length. For the width-length flexure mode, $$(l^2 1w) \times f = k_f, \qquad (2)$$

where $l$ is length and $w$ is width.

Figure 2:
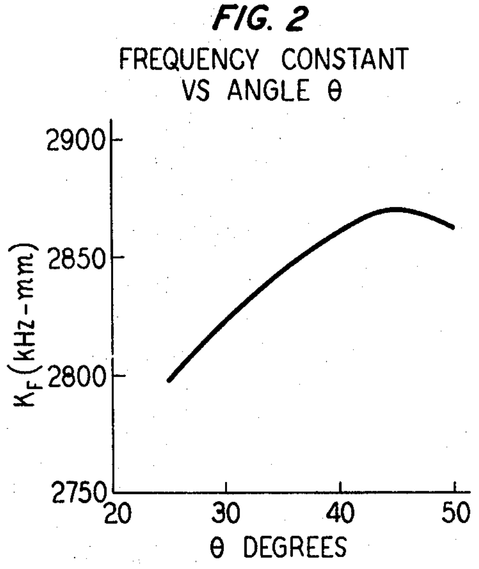
FIG. 2 is a graph of frequency constant $K_f$ in kilohertz · millimeters versus orientation angle $\theta$ of a lithium tantalate single crystal of the invention.
Figure 4:
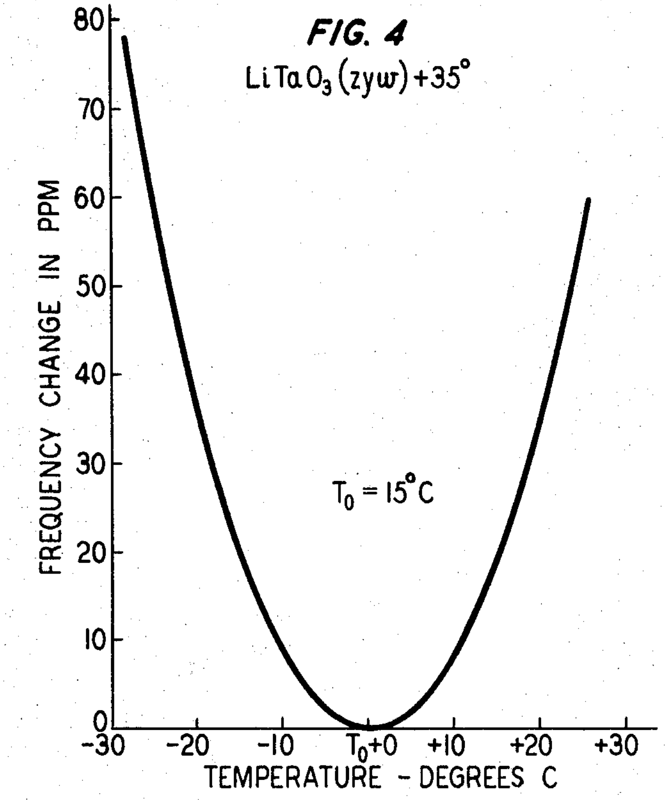
FIG. 4 is a graph of frequency change in parts per million versus temperature in °C. for a crystal of the invention having an orientation angle of +35°.
Figure 5:
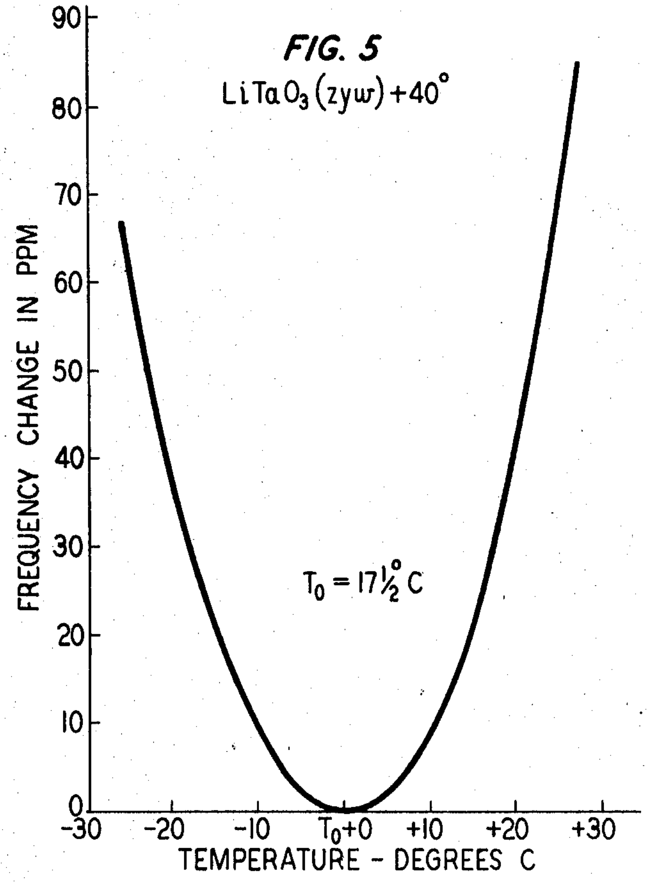
FIG. 5 is a graph of frequency change in parts per million versus temperature in °C. for a crystal of the invention having an orientation angle of +40°.
Figure 6:
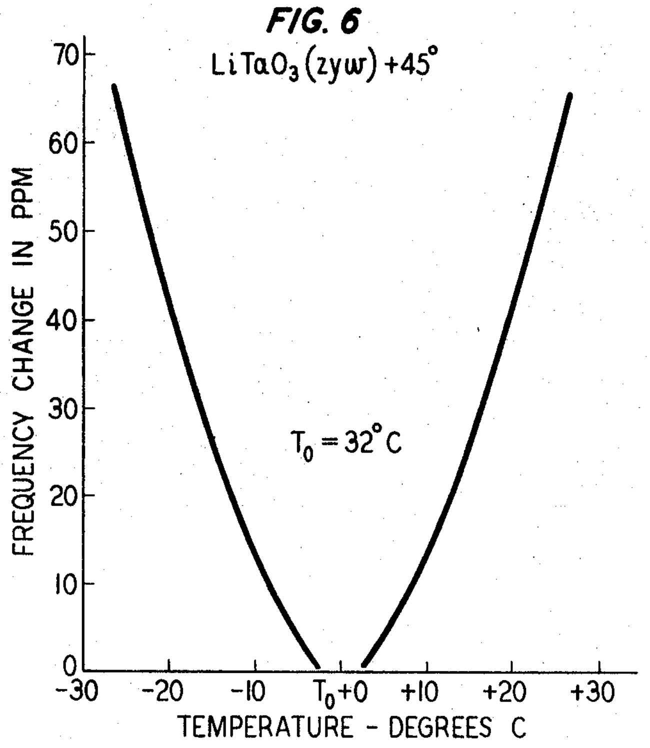
FIG. 6 is a graph of frequency change in parts per million versus temperature in °C. for a crystal of the invention having an orientation angle of +45°.
Figure 7:
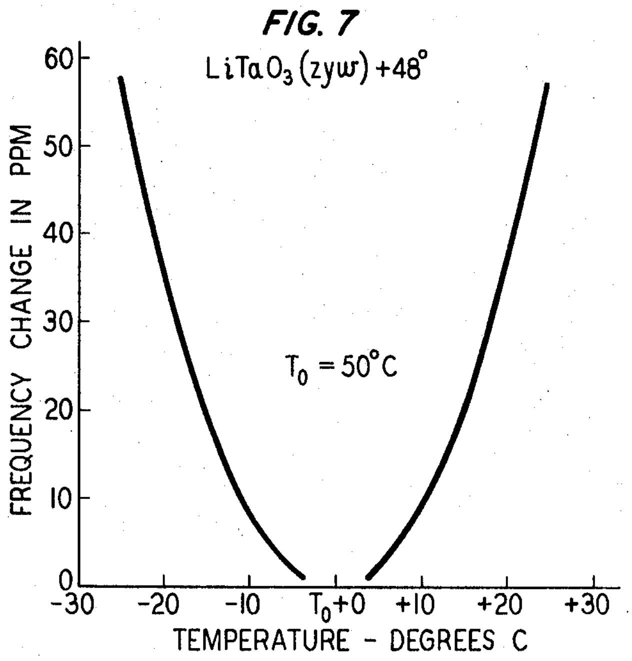
FIG 7 is a graph of frequency change in parts per million versus temperature in °C. for a crystal of the invention having an orientation angle of +48°.
Figure 8:
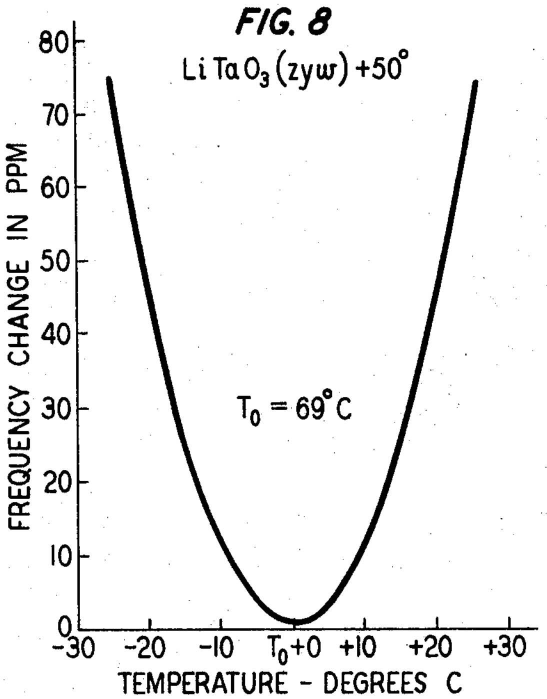
FIG. 8 is a graph of frequency change in parts per million versus temperature in °C. for a crystal of the invention having an orientation angle of +50°.

Referring now to FIG. 2, there is shown a graph of frequency constant $K_f$ in kilohertz · millimeters versus orientation angle $\theta$ for lithium tantalate single crystal length extensional mode resonators of the invention. Some orientations and their frequency constants are given in Table I.

Table I

| Orientation Angle ($\theta$) | Frequency Constant $K_f$ kHz. mm. |
|---|---|
| +25° | 2797 |
| +35° | 2840 |
| +40° | 2853 |
| | 286748° |
| +50° | 2862 |

Although as can be seen from the curve in FIG. 1, $K_f$ varies with $\theta$, such variation corresponds to only small changes in the actual physical dimensions of the lithium tantalate crystal for a particular center frequency. It should be noted that the maximum frequency constant and therefore the minimum crystal length for any given frequency is obtained for an orientation angle of about 45°.

Length having been determined for the length extensional mode according to the center frequency desired, the width and the thickness dimensions are not critical It is preferred, however, to maintain the width below one-half the length in order to insure against the appearance of undesirable vibrational modes such as the width-extensional mode. In practice, it will often be found advantageous to choose dimensions such that a long, thin bar having low impedance results.

Figure 3:
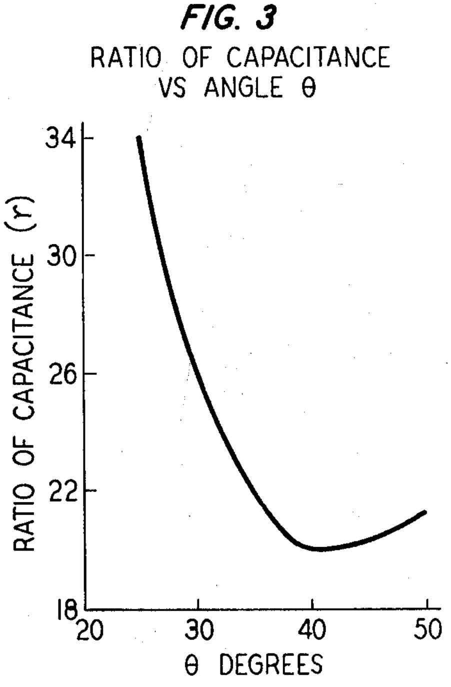
FIG. 3 is a graph of the ratio of capacitance $r$ versus angle $\theta$ for a lithium tantalate single crystal of the invention.

The bandwidth of the frequencies set up in the crystal is in general determined by the coupling coefficient which is proportional to the ratio of capacitance $r$ of the crystal. Ratio of capacitance $r$ is defined by $$\frac{1}{r}=\frac{C_1}{C_o}=\frac{f_p^2-f_s^2}{f_s^2} \qquad (3)$$

where $C_o$ and $C_1$ are the static and motional capacitances of the resonator, and $f_p$ and $f_s$ are the frequencies corresponding to parallel and series electrical resonance, respectively. It is an advantage of this material that its ratio of capacitance is about 1/6 that of quartz, thus permitting its use as a wideband crystal filter or wideband voltage controlled oscillator. Referring now to FIG. 3 which is a graph of ratio of capacitance $r$ versus orientation angle $\theta$ for length extensional mode resonators, it is seen that $r$ varies markedly with $\theta$, thus permitting variation of the bandwidth by varying $\theta$. As can be seen for a $\theta$ of +40°, $r$ has a minimum value of 19.9 and increases to 21.3 at a $\theta$ of +50°. At a $\theta$ of +35°, $r$ has increased to 22 and increases very rapidly for smaller angles. Thus, where a wide bandwidth is desirable, it may be preferred to choose the angle $\theta$ between the limits of 35° and 50°.

In FIGS. 4, 5, 6, 7, and 8, frequency change in parts per million is plotted versus temperature in °C. for various angles, $\theta$ for the length extensional mode. Each of these curves has an approximately parabolic shape so that the lowest point on the curves represents the temperature at which the temperature coefficient of frequency is zero. This temperature is defined as the turnover temperature, $T_o$, above and below which the temperature is plotted as positive and negative, respectively. For temperature deviations within the range of $T_o$ ±25° C., the maximum frequency change is about 78 parts per million for the curve in FIG. 8. These changes represent temperature coefficient of frequency values which are acceptable for the intended device uses.

Figure 9:
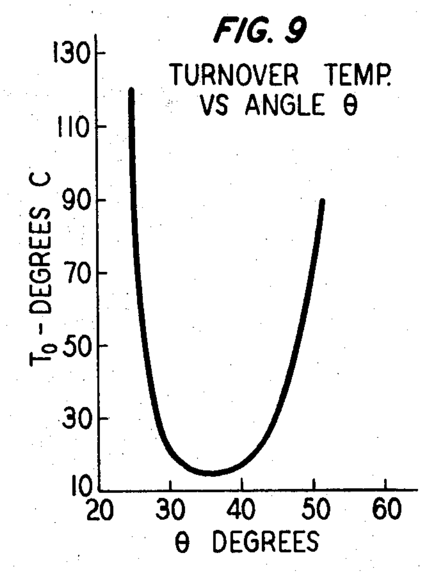
FIG. 9 is a graph of turnover temperature in °C. versus angle $\theta$ for the crystal of the invention.

Referring now to FIG. 9, there is shown a graph of turnover temperature in °C. versus angle $\theta$ in the range 25° to 50° for the length extensional mode. The turnover temperature is about 120° C. at a $\theta$ of 25°, while $\theta$s from +35° to +50° result in turnover temperatures in the range of 15° C. to 68° C. These results will aid the practitioner in choosing an orientation angle such that a turnover temperature convenient for his intended use will result. It will be noted that while there are two possible orientation angles for a given turnover temperature, it may be preferred to choose a $\theta$value above 35° where optimum bandwidths are desired.

Figure 10:
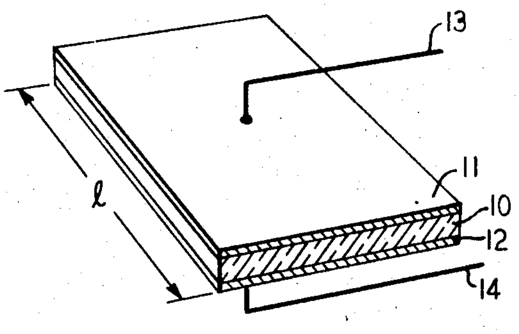
FIG. 10 is a perspective view of one embodiment of an electrical device including a crystal of the invention.

Referring now to FIG. 10, there is shown one embodiment of an electrical device including a lithium tantalate fundamental length extensional mode resonator of the invention. To opposite parallel faces having one dimension equal to length $l$ of resonator 10 are attached suitable electrodes such as chrome-gold electrodes. Electrical leads 13 and 14 attached to electrodes 11 and 12 provide input and output means connected to associated circuitry not shown.

While the description has largely been in terms of resonators operating in the fundamental length extensional mode of vibration, it will be appreciated by those skilled in the art that the advantages of zero temperature coefficient of frequency and small ratio of capacitance are generally retained for resonators operating in overtones of the length extensional mode and in the width-length flexure mode.

Figure 11:
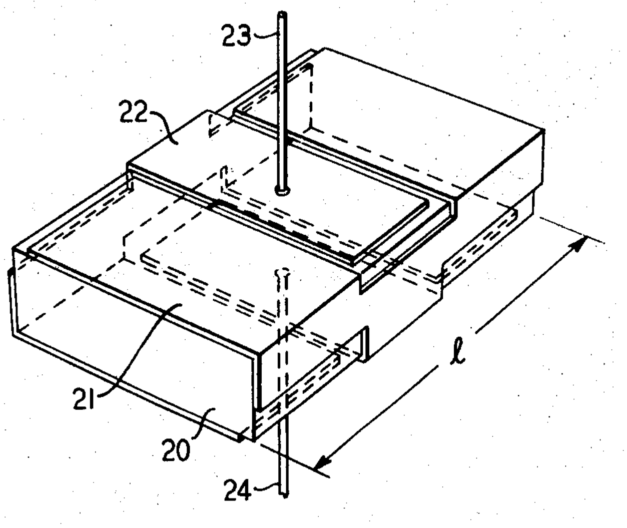
FIG. 11 is a perspective view of another embodiment of an electrical device including a crystal of the invention.

Referring now to FIG. 11, there is shown one embodiment of an electrical device including a lithium tantalate third overtone length extensional mode resonator of the invention. To opposite parallel faces having one dimension equal to length $l$ of resonator 20 are attached electrodes 21 and 22. Electrical leads 23 and 24 attached to electrodes 21 and 22 provide input and output means.

Figure 12:
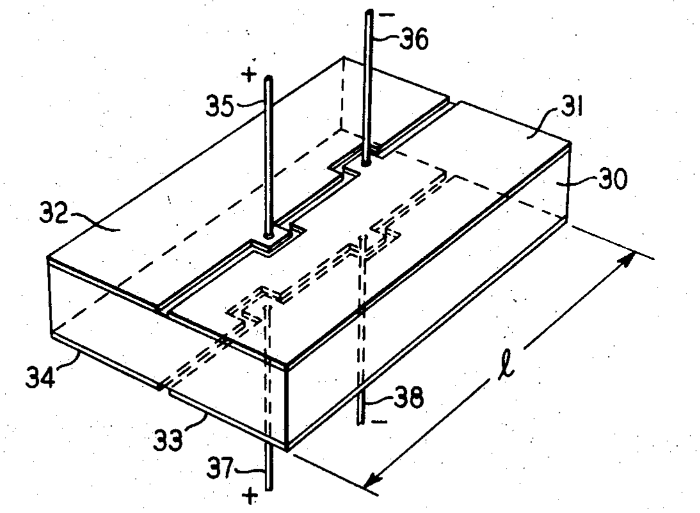
FIG. 12 is a perspective view of still another embodiment of an electrical device including a crystal of the invention.

Referring now to FIG. 12, there is shown one embodiment of an electrical device including a lithium tantalate width-length flexure mode resonator of the invention. To opposite parallel faces having one dimension equal to length $l$ of resonator 30 are attached negative electrodes 31 and 34, and positive electrodes 32 and 33. Electrical leads 35, 36, 37, and 38 are attached to the electrodes and provide input and output means.

The $LiTaO_3$ crystals to operate satisfactorily in such devices should be at least 99 percent pure and should not deviate by more than ±10 percent of stoichiometry, where Li and $TaO_3$ are nominally present each in the amount of 50 mole percent.

Some representative characteristics of the lithium tantalate resonators of the invention having orientation angles $\theta$ of +45° are given in Table II.

Table II

| Mode | $K_f$* | $r$** | $K_L$*** |
|---|---|---|---|
| Fundamental length extensional | 2870 | 20 | 0.15 |
| Third Overtone length extensional | 8585 | 29.8 | 0.02 |
| Width-length flexure | 5225 | 36.1 | 11.46 |

*Frequency constant (kilohertz · millimeter)
**Ratio of capacitance
***Inductance constant (Henry/millimeter)

The invention has been described in terms of a limited number of embodiments. However, since it essentially teaches preferred orientations of lithium tantalate resonators having low temperature coefficients of frequency, other embodiments are contemplated. For example, the resonator could be used as a wideband voltage controlled oscillator as well as a crystal filter.

What we claim is:

1. An electrical device including a piezoelectric single crystal resonator of length $l$, said resonator having at least two opposite parallel faces of length $l$, and at least two electrodes attached to said faces, characterized in that said crystal consists essentially of lithium tantalate having an orientation within the range $zyw$ +25° to $zyw$ +50°.

2. The device of claim 1 in which all of the crystal faces are rectangular.

3. The device of claim 1 in which said crystal resonates in the fundamental length extensional mode.

4. The device of claim 3 in which said crystal has an orientation within the range $zyw$ +35° to $zyw$ +50°.

5. The device of claim 3 in which the width $w$ of the crystal is up to one-half the length $l$ of the crystal.

6. The device of claim 1 in which said crystal resonates in an overtone of the length extensional mode.

7. The device of claim 1 in which said crystal resonates in the width-length flexure mode.